(12) United States Patent
Mayer

(10) Patent No.: US 10,069,136 B2
(45) Date of Patent: Sep. 4, 2018

(54) MIXTURE OF BASIC LEAD SULFATES

(71) Applicant: George E. Mayer, Venetia, PA (US)

(72) Inventor: George E. Mayer, Venetia, PA (US)

( * ) Notice: Subject to any disclaimer, the term of this patent is extended or adjusted under 35 U.S.C. 154(b) by 656 days.

(21) Appl. No.: 14/120,632

(22) Filed: Jun. 11, 2014

(65) Prior Publication Data

US 2014/0287313 A1  Sep. 25, 2014

Related U.S. Application Data

(63) Continuation of application No. 12/923,623, filed on Sep. 29, 2010.

(60) Provisional application No. 61/272,490, filed on Sep. 29, 2009.

(51) Int. Cl.
| | |
|---|---|
| H01M 4/20 | (2006.01) |
| C01G 21/20 | (2006.01) |
| H01M 4/36 | (2006.01) |
| H01M 4/58 | (2010.01) |

(52) U.S. Cl.
CPC .............. H01M 4/20 (2013.01); C01G 21/20 (2013.01); H01M 4/362 (2013.01); H01M 4/5825 (2013.01); *C01P 2006/10* (2013.01); *C01P 2006/14* (2013.01); *C01P 2006/40* (2013.01)

(58) Field of Classification Search
CPC ....... H01M 4/20; H01M 4/362; H01M 4/5825
See application file for complete search history.

(56) References Cited

U.S. PATENT DOCUMENTS

| | | | |
|---|---|---|---|
| 3,765,943 A | 10/1973 | Biagetti | ............... 141/32 |
| 3,765,946 A | 10/1973 | Werner et al. | ............... 429/410 |
| 4,331,516 A | 5/1982 | Meighan | |
| 4,338,163 A | 7/1982 | Rittenhouse | |
| 4,381,250 A | 4/1983 | Rittenhouse | |
| 4,388,210 A | 6/1983 | Parker | |
| 4,415,410 A | 11/1983 | Reich | |
| 5,252,105 A | 10/1993 | Witherspoon et al. | |
| 5,273,554 A | 10/1993 | Vyas et al. | |
| 5,302,476 A | 4/1994 | Kao et al. | |
| 5,314,766 A | 5/1994 | Witherspoon et al. | |
| 5,660,600 A | 8/1997 | Vyas et al. | |
| 6,352,795 B1 | 5/2002 | Nilsson | |
| 7,011,805 B2 | 3/2006 | Flores-Lira et al. | |
| 7,118,830 B1 | 6/2006 | Boden | |
| 7,091,250 B2 | 8/2006 | Klein et al. | |
| 7,309,478 B2 | 12/2007 | Flores-Lira et al. | |
| 7,459,140 B2 | 7/2008 | Flores-Lira et al. | |
| 7,435,758 B2 | 10/2008 | Klein et al. | |
| 7,517,370 B2 | 4/2009 | Petersen et al. | |
| 7,550,131 B2 | 6/2009 | Flores-Lira et al. | |
| 7,582,384 B2 | 9/2009 | Flores-Lira et al. | |
| 2004/0121233 A1 | 6/2004 | Klein et al. | ............ 429/227 |
| 2004/0234852 A1 | 11/2004 | Klein et al. | |
| 2005/0207969 A1 | 9/2005 | Flores-Lima et al. | |
| 2006/0088465 A1 | 4/2006 | Flores-Lima et al. | |
| 2006/0093912 A1 | 5/2006 | Mayer | |
| 2006/0110524 A1 | 5/2006 | Zhang et al. | |
| 2006/0269801 A1 | 11/2006 | Honbo et al. | |
| 2008/0063943 A1 | 3/2008 | Flores-Lima et al. | |
| 2008/0063944 A1 | 3/2008 | Flores-Lima et al. | |
| 2008/0181841 A1 | 7/2008 | Flores-Lima et al. | |
| 2009/0253041 A1 | 10/2009 | Beckley | |

OTHER PUBLICATIONS

Kuniants, I.L. Encyclopedia of Chemistry, p. 267 Moscow (1998).
Kupetov, A.M. Processes and apparatus of chemical technology, pp. 94-97, 407-424, Moscow (2002).
Perry's Chemical Engineer's Handbook, 7th Ed. (1997), Table 18-4.
Biagetti, Tetrabasic Lead Sulfate as a Paste Material for Positive Plates, Bell System Technical Journal, Sep. 1970, 1305-1319.
Translation of Offical Action received in Russian application 2009143115, corresponding to provisional on which parent was based.
Mayer, George E.,Battery Processing I, Kinetics of Growth of Basic Lead Sulfates During Battery Plate Curing, Advances in Lead-Acid Batteries,Electrochemical Society Proceedings 84-14 (1984).

*Primary Examiner* — Oi K Conley
(74) *Attorney, Agent, or Firm* — Michael de Angeli

(57) ABSTRACT

A microporous lead-containing solid material is produced, which can serve as a carrier for desired materials into a reaction for various desired purposes. For example, if the microporous solid is impregnated with borax it tends to inhibit the growth of unduly large crystals of tetrabasic lead, which is useful in producing batteries having improved functional qualities.

17 Claims, No Drawings

MIXTURE OF BASIC LEAD SULFATES

CROSS-REFERENCE TO RELATED APPLICATION

This application claims priority from provisional application Ser. No. 61/272,490, filed Sep. 29, 2009.

FIELD OF THE INVENTION

The present invention relates to a novel, low density, high porosity chemical mixture of, primarily, basic lead sulfate salts which is useful as a carrier to convey other materials into a chemical process, to processes for its use, and to products made thereby. For example, the material of the invention can be used as a carrier for other materials which act to inhibit excessive crystal growth in lead-acid battery paste, which yields improved battery performance.

BACKGROUND OF THE INVENTION

Significant background material on the manufacture of lead-acid batteries can be found in the inventor's prior U.S. patent application Ser. No. 11/234,077 and corresponding PCT application PCT/US2005/034214, published as WO 2006/034466 and incorporated herein by this reference. Some of this material is reproduced below.

An important and time-consuming aspect of manufacture of lead-acid batteries is the curing of wet active paste material precursor into a dry porous mass. The paste precursor typically is in the form of flakes of "leady oxide", i.e. flakes of solidified lead particles which have a PbO coating. The leady oxide is made into a wet, pliable dough ("paste") by mixing it with water and then with sulfuric acid. The dough then is extruded onto mechanically rigid, electrically conductive grids in a process called "pasting". The resulting pasted grids are cured at elevated temperature and humidity to react PbO with sulphuric acid, to form lead sulfate salts, and to oxidize the lead core of the leady oxide to PbO to form additional lead sulfate salts.

Lead sulfate salts which provide mechanical strength and porosity to the leady oxide paste, and ultimately become part of the active material, include tribasic lead sulfate $3PbO \cdot PbSO_4 \cdot H_2O$ ("3BS") and tetrabasic lead sulfate $4PbO \cdot PbSO_4$ ("4BS").

The 3BS typically forms at low temperature and low humidity, whereas 4BS typically forms at higher temperatures (>70° C.) and higher humidity. The 3BS typically forms as small needle-like crystals which measure about 3 microns long and less than about 1 micron in each of width and thickness. The 4BS crystals are larger, and grow in length from several microns to several hundred microns. The longer 4BS crystals have width and thickness in proportion to length. For example, a 300 micron long 4BS crystal might have a width of 60 microns and a thickness of 50 microns. A 4BS crystal that measures 300 microns long by 60 microns wide and 50 microns thick has a surface area of 72000 square microns, and a volume of 900,000 cubic microns. This volume, if tightly packed with the smaller 3BS crystals, would hold about $10^7$ 3BS crystals which have a total surface area of about $7.2 \times 10^6$ square microns, i.e. 1000 times greater surface area. The size and shape of the crystals in the cured paste can be measured by scanning electron microscopy (SEM). The amounts of the 3BS and 4BS crystals may be determined by x-ray diffraction (XRD).

In general, the useful capacity of a battery, particularly its ability to deliver high current for short periods of time, as required for example in the starting of internal combustion engines, is improved by increase in the surface area of the lead compounds in the cured paste. Accordingly, large crystals of 4BS are less desirable than smaller crystals, although the presence of 4BS is itself desirable.

The production of 4BS generally requires very careful control of temperature and humidity during cure of the pasted plates. Premature dryout and/or cooling of the plates during the curing process inhibit the formation of 4BS. Some battery manufacturers specify control and uniformity to ±2° C. and ±1% relative humidity (RH) compared to setpoints during cure. It has generally been observed that addition of red lead ($Pb_3O_4$) allows adequate processing flexibility to allow production of 4BS over a larger range of temperature and relative humidity relative to setpoints; however, in controlled experiments, the red lead addition appears to interfere with free Pb oxidation.

Production of 4BS entails nucleation of crystals and their subsequent growth. Nucleation is effected by exposing the pasted plates to temperatures of about 70° C. or higher at high humidity at the beginning of cure. Nucleation and crystal growth during cure can require an induction period of about 10 hours since 4BS forms as molecules, which slowly coalesce by diffusion into seeds. These seeds can react with additional nearby material to grow into crystals. The growth rate of the 4BS crystals depends on various factors such as the composition of the lead oxide used, the oxide to sulphuric acid ratio in the paste mixture, the mixer type, mixing time, mixing temperature, temperatures between process steps, flash drying conditions, as well as the temperature and humidity inside the curing chamber, as mentioned above.

The growth of 4BS can proceed by two mechanisms. Large isotropic and "regular", i.e. uniaxial, crystals, can be prepared by preferential deposition of a material onto one face of a seed crystal by a screw-dislocation or a slip-plane mechanism. Since only one face of each crystal grows, the process is slow. Crystals grown by this mechanism have smooth crystal faces and sharp angles between adjacent faces. Alternatively, crystals that grow anisotropically may be produced faster by fractal growth. Fractal growth entails growing the crystals at many locations and in many different directions simultaneously, i.e. multiaxially. The resulting fractal crystals are irregular and smaller in size. Fractal crystal growth may be confirmed by plotting "quantity produced" vs. time. Regular growth provides a straight-line linear plot. Fractal growth provides a straight-line log-log plot. Fractal crystal growth may produce greater mechanical strength in a paste pellet because the multiaxial crystals interlock better than the uniaxial crystals do. Fractal growth also may produce better electrical conductivity when it occurs in the paste.

Some battery manufacturers prefer 3BS rather than 4BS for engine cranking (also known as SLI, for "starting, lighting, and ignition") batteries, which may be flooded, gelled, or absorptive glass mat (AGM) in design. To some degree this is because traditional curing processes tend to create highly variable yields of 4BS which have a large crystal size and a small amount of very large pores, and hence low surface area per unit weight. This variability in yield and the undesired crystallinity and porosity tends to cause variable (and generally poor) battery cranking performance in SLI batteries. Accordingly, many manufacturers prefer to avoid formation of 4BS insofar as possible.

When curing conditions are adjusted to preclude nucleation and growth of 4BS, a predominance of 3BS is produced. The 3BS has uniform crystal shape and size (3 microns ×approximately 0.5 microns ×approximately 0.5 microns). When a plate is pasted with 3BS the plate has uniform porosity and high cranking performance.

Historically, free Pb was a desired component of battery paste. The free Pb was thought to generate heat during cure of the pasted battery plates to enhance production of 3BS, 4BS and porosity. This heating, however, was uncontrolled and erratic, and the resultant plates did not always have the composition and/or porosity desired. Free Pb is now considered undesirable. A high amount (more than about 2 wt. %) of free Pb at the end of curing can lead to shedding and spalling failure of the positive plates and/or high self-discharge of "formed" $PbO_2$ plates.

The amount of free Pb in leady oxides typically is about 25 wt. %, but can form in amounts of 20 to 40 wt. % free Pb depending on the apparatus and the process settings. It is difficult and costly to produce a leady oxide with about 15 wt. % or less free Pb, and even more costly to produce a nonleady oxide. This latter usually requires a subsequent thermal processing, in small batches. Discharge capacity of a battery depends on the porosity and surface area of the porous battery electrode. Both the positive electrode, which for a lead-acid battery is the lead dioxide electrode, and the negative electrode, which for the lead-acid battery is the sponge Pb electrode, need porosity. The porosity of negative plates, during battery use, is improved by the well-known use of "expander" additives, which are comprised of barium sulfate, carbon black and lignosulfonic acid salts. All lead-acid electrodes which have a larger surface area have a higher discharge capacity, and higher utilization of the active material at any rate of discharge. In high discharge rate batteries such as SLI batteries, 3BS has been the preferred active material precursor, but if the undesirable growth of large crystals of 4BS can be inhibited, as provided by the invention, 4BS would also be desired in SLI applications. 4BS is the preferred material precursor for deep cycle and long-life stationary batteries. 4BS is also now the preferred precursor for use in modern nonantimonial grid batteries, the so-called "maintenance-free" batteries for SLI, float or cycling application, because the 4BS helps prevent PCL (premature capacity loss), i.e. short battery life. According to the present invention, the best features of 3BS and 4BS can be obtained simultaneously, without any apparent shortcomings, as described below.

Curing promotes adhesion of battery paste to the grids. The battery paste, which has an alkaline pH, reacts with (corrodes) lead alloy in the grid to partially convert the lead alloy to Pb compounds and ultimately to 3BS and 4BS. Generally, the higher the temperature employed during cure, the better the adhesive bond produced.

As mentioned above, production of 4BS depends on nucleation and growth of 4BS crystals. One way to get 4BS nuclei immediately into a battery paste is to use 4BS seed crystals, such as those prepared by grinding large crystals of pure 4BS. Large 4BS crystals can be made by any of several well-known aqueous slurry processes. These processes, however, are slow, and yield only a small amount of 4BS in copious amounts of liquid. Accordingly, this is very costly. Another way to produce 4BS is to use an Eirich mixer wherein 4BS is made into a more concentrated slurry, and then removing excess water by vacuum and heat. A pyrometallurgical reactor (Barton pot) also may be used to make 4BS. A slurry reactor and reactive grinding may be also be used to make 4BS. These methods, however, do not produce multiaxial crystals of 4BS, or seed crystals which can grow multiaxial crystals in battery plate pastes.

Ser. No. 11/234,077 discloses a paste curing additive ("PCA") for battery paste for use in, for example, lead acid battery positive plates, and its methods of manufacture and use. The PCA limits production of larger 4BS crystals by nucleating growth of numerous 4BS crystals, so that more and therefore smaller 4BS crystals are present in the final product, as well as to grow the 4BS in multiaxial crystal groupings. PCA, which itself contains little 4BS, can be used to make more 4BS, and may be used to reduce the cure time of active material paste, as well as to reduce the amount of energy required during curing.

PCA also may be used to enhance production of 3BS during mixing and cure of battery paste. The PCA may be used to enhance curing of pasted battery plates, especially pasted battery plates intended for SLI lead-acid batteries.

PCA also may be used to achieve greater porosity in the form of higher numbers of pores as well as larger sizes of pores in the cured plate. PCA also may be used to speed oxidation of free lead residue in pasted plates during cure. PCA also may be used to enhance adhesion of the cured paste to the grid. These may provide greater utilization of the active material and easier conversion from the non-active "paste" state to the "active material" state.

PCA in amounts of about 1 wt. % to about 12 wt. % based on the weight of leady oxide may be used to speed the cure of battery plates at temperatures of about 56° C. to about 100° C. at RH of about 10% to about 100%.

Lead acid battery plates which include PCA may also cure faster and may show improved performance. In side-by-side tests for lead-acid traction battery positive plates, PCA outperformed a commercial ground 4BS crystal seed material: <2% free Pb was achieved in <20 hr with PCA, in 24 hr with the competitor material and in >40 hr with no additive (control). When these cured plates were tested in a cycling (charge/discharge) regime, controls operated <1000 cycles, the competitor material operated approximately 1500 cycles and PCA operated to >2500 cycles to end of life. The PCA cells were removed from test to allow testing of other cells; from the data trend it appears that PCA should have operated to >3000 cycles, which is twice the industry standard requirement of 1500 cycles.

The use of PCA may improve development of crystals of lead sulfate such as 3BS and 4BS, and may enhance more rapid development of porosity and the oxidation of free lead.

In one exemplary process, PCA is produced as the reaction product formed by heating a battery paste to a temperature of about 80° C. to about 90° C. for about 5 min. to about 10 min., wherein the battery paste includes sulfuric acid in an amount of about 5 wt. % to about 6 wt. %, water in an amount of about 12 wt. % to about 16 wt. %., and balance leady oxide, all amounts based on total weight of sulfuric acid, water and leady oxide. The additive may be then be used in any of its dried or undried states.

In a second exemplary process, the PCA is produced as the reaction product formed by heating a battery paste to a temperature of about 70° C. to about 90° C. for about 10 min. to about 90 min., wherein the battery paste includes sulfuric acid in an amount of about 3 wt. % to about 10 wt. %, water in an amount of about 10 wt. % to about 20 wt. %., and balance leady oxide, all amounts based on total weight of sulfuric acid, water and leady oxide.

As mentioned above, starting-lighting-ignition (SLI) lead-acid batteries have as their major mission to provide high current to the starter motor, which crank the internal-combustion engines of motor vehicles until they start. There is a market need to improve cranking ability while simultaneously reducing size, weight and cost. Cranking requires a high current (hundreds of amperes) battery discharge over a short period (<1 min.) of time. This requires that the active materials of the battery have a large and intimate contact area: the larger the surface area, the greater the cranking performance, all other things being equal.

Lead-acid batteries contain three electrochemically active ingredients, two being sets of solid members forming numerous opposed pairs of oppositely polarized "plates" and the third being the sulfuric acid electrolyte, which is disposed within and between the plates. The plates are connected together in two groups; the positive polarity plates contain $PbO_2$ and the negative polarity plates contain sponge Pb. As mentioned above, and as further detailed below, plates typically comprise conductive lead alloy frames called "grids" which at manufacture are filled with a "paste" of the approximate consistency of a plastic dough mixed from leady oxide (i.e., flakes of solidified lead particles with a PbO coating), water and sulfuric acid, cured, and then electrochemically "formed" or charged. Pastes intended for positive and negative plates are generally similar, except that pastes for negative plates contain other ingredients called "expanders". One assembly of two sets of opposite-polarity plates, along with electrically insulating but porous separators, the electrolyte, and the containment for all of these comprise a single cell. Two or more (usually 3 or 6) series-connected cells comprise a battery.

The surface of each plate, both positive and negative, formed by pasting as described above, consists of two intermeshed parts: a discontinuous solid phase formed of the various lead compounds described above, interspersed with a discontinuous void space, which will ultimately be filled with electrolyte. In order to provide adequate surface area, the solid phase should consist of moderately large crystals with a "fuzzy" surface, or more numerous smaller crystals. The latter approach has traditionally been used by battery manufacturers, where the small crystals (approximately 3 microns long) are tribasic lead sulfate ("3BS") the chemical composition of which is $3PbO.PbSO_4$ or, if hydrated, $3PbO.PbSO_4.H_2O$. 3BS can be produced during the mixing of the battery paste or during the subsequent recrystallization or "curing" step, typically carried out at <70° C. During mixing and curing, different basic lead sulfate salts can be produced under different conditions. These range from nonbasic lead sulfate (0BS, $PbSO_4$) through 1BS ($PbO.PbSO_4$) and 2BS ($2PbO.PbSO_4$) to 3BS as above and ultimately to 4BS ($4PbO.PbSO_4$). 0BS, 1BS and 2BS are generally undesirable in cured battery plates. 4BS, which is nucleated at >70° C. but which can subsequently grow after nucleation at any temperature from nearly 0° C. to 100° C. (below this range $H_2O$ freezes and above this range $H_2O$ boils, of course), is desirable for use in long-life deep-cycling applications such as fork lift truck batteries, and may be useful to some degree in SLI battery applications as well, if the 4BS crystals can be inhibited from growing overly large. Thus, there is a desire to provide as much 4BS in the battery paste as possible, especially for batteries intended for deep-cycle applications, if certain problems inherent in the use of 4BS as mentioned can be overcome.

More specifically, and as also noted above, while 3BS crystals stop growing at 3 microns, 4BS crystals can grow to become several hundred microns in length. This size is mechanically and electrically desirable, but as these large crystals provide comparatively little surface area, they are electrochemically undesirable. Accordingly, smaller 4BS crystals are desirable to maximize the ratio of surface area to weight.

Generally, one 4BS crystal grows from a single seed, the seed consisting of ground, macro-crystalline 4BS, as is now commercially available. To grow small 4BS crystals, one approach (for example in U.S. Pat. Nos. 7,118,830 and 7,517,370) is to use very finely ground (0.1 to 5 micron) 4BS seeds, but this finely ground material is difficult to handle and provides a significant dust hazard which is undesirable. Another approach is to use a larger quantity of seed (20% rather than the usual 1 to 2%), but seed is costly and larger amounts appear to be preferentially consumed before leady lead oxide in the paste mixing and/or curing processes.

Higher growth temperatures for the growth of 4BS, performed with or without 4BS seeds, impart secondary nucleation of 4BS (desirable) and also generally give better grid-paste adhesion (also desirable) by way of enhanced grid corrosion by the alkaline battery paste. Thus, curing the paste at higher temperatures will generally result in the formation of more 4BS, but manufacturers may not be able or willing to cure the paste at such elevated temperatures.

SUMMARY OF THE INVENTION

The approach taken by the present invention is to provide seed of relatively large size, e.g. 20-40 micron, or <325 mesh, to nucleate the growth of 4BS crystal, so as to avoid the problems inherent in use of extremely fine powders, but to take precautions to interfere with the growth of the 4BS crystals, so as to limit the size of these crystals. Even though the seed particles were 20 to 40 microns in size, in the course of being mixed into paste and/or cured, the particles disintegrated and the resultant 4BS was acicular and generally under 40 microns in length, even without other precautions to limit the size. As mentioned, finely powdered 4BS seeds, such as are described in U.S. Pat. Nos. 7,118,830 and 7,517,370, are costly to make and difficult to handle.

In order to prevent or limit growth of over-large crystals of 4BS, one could drastically change the curing conditions, but this would preferentially affect the outsides of each plate, and, worse, perhaps affect only the outside plates of a stack of pasted plates stacked up for curing in an oven.

The present invention recognizes that as crystal growth generally proceeds in the direction of a single preferred crystallographic plane of a seed, one possibility for limiting crystal growth might be to add materials to the paste that would tend to modify the "crystal habit", i.e. activate or deactivate growth of crystals along various planes.

The literature, for example Perry's Chemical Engineer's Handbook, 7th edition (1997) at Table 18-4 contains several examples of the use of borax to modify the crystallization of soluble alkaline earth and transition metal sulfates such as $MgSO_4$ and $ZnSO_4$. Borax in a quantity of 5% is reportedly used to aid growth of crystals of these salts, although the original papers show no insight as to how this is accomplished. As materials such as $MgSO_4$ and $ZnSO_4$ are very soluble in water whereas basic lead sulfates are nearly insoluble in water, such that the chemical behavior of the respective substances are generally nonanalogous, there is no reason to expect that borax would be helpful in controlling the growth of 4BS crystals. Neither borate ion nor sodium is deleterious to battery operation, but unfortunately even as little as 0.1% borax can make battery paste soupy and unprocessable. Other salts have various other problems. For solubility and minimal materials costs, sodium salts are preferred to Li, K, Sr, etc. Some other sodium peroxysalts (perborate, persulfate, percarbonate) have been used in batteries, but here the salt additive is intended to provide the peroxy oxygen to oxidize some Pb(O) to $Pb_2O_3$, $Pb_3O_4$ or $PbO_2$. Even nonalkaline salts such as boric acid might be useful.

Assuming that borax or perhaps some other material would be useful in limiting 4BS crystal growth, the next concern is to find a way to convey such a crystal growth-modifying ingredient into a workable paste mix. Any organic carrier can degrade ultimately to acetic acid, which undesirably corrodes the positive grids. Any inorganic carrier would need to be extremely porous, such that the additive, e.g. borax, would slowly dissolve and diffuse from the carrier to the 4BS growth plane, would also need to be extremely inexpensive, and would also need to be inert so as not to interfere with the battery operating conditions. This precludes use of most materials except titania, that is, $TiO_2$, and lead compounds. Titania, used widely as a white paint pigment, is much cheaper than various nonstoichiometric titanium oxides, which have rough surfaces, but has no significant internal porosity. Titania, if used, would remain inert within each plate, that is, would not participate in charge or discharge, and would thus add undesired weight. Therefore, no titanium-oxygen material is particularly suitable as a carrier.

Considering the possibility of making a porous lead compound to contain the borax or other crystal growth inhibitor, it would be difficult to create porosity by adding water, air, or a gas-producing salt, as most lead compounds are made by a pyrolytic process at temperatures above the melting point of Pb (327.46° C.) and the heat would drive off or decompose the additive. Soluble anions such as chloride, acetate, perchlorate, or nitrate are deleterious to battery operation because they enhance the undesirable grid corrosion if a lead-based carrier were to be attempted using a hydro (low temperature aqueous solution) process. SEM microscopy shows little if any porosity in 3BS, 4BS or any of the other basic lead sulfates made by any of the solution/slurry methods. It would seem that a highly porous lead-based carrier would be impossible.

The simplest selection criterion for high porosity of a lead material is low material density. Although lead and its compounds generally have densities >9g/cc, the inventor has discovered a lead compound with density approximately one third of this and a corresponding increase in porosity. SEM micrographs show that each grain of this novel lead mixture (described in detail below, and hereinafter called "Fluff") is microporous, lead mixture (described in detail below, and hereinafter called "Fluff") is microporous, and that the low density is not merely imparted by a rough surface. When the Fluff was mixed with a borax solution, the borax was absorbed in the pores of the Fluff, as shown by the unchanged golden color and by an increase in material density. Summarizing the process of producing a borax-containing Fluff, the process being further detailed below: in order to introduce the borax into grains of the porous Fluff lead material, the most soluble borax form, borax decahydrate, was dissolved in water, mixed with the Fluff, and dried, leaving borax within the pores of the Fluff, probably in the form of a lower, less soluble hydrate, e.g., borax.$5H_2O$. The final product, in a batch consisting of 3 kg of Fluff lead material having been impregnated with 5 kg of borax decahydrate solid material, fits within a one gallon can after drying.

The improvements and advantages provided by using such a combination of borax with the novel Fluff microporous lead sulfate mixture carrier (the combination hereinafter being referred to as "BF") include that it has no effect on the processing characteristics of battery paste containing this material, and that its use, like PCA, limits the size of the 4BS crystals formed to 40 to 60 microns, presumably by causing more crystals to form and thereby reduce their size. Other crystals of large surface area and fine crystal structure are also formed, as shown by SEM, also providing improved high rate battery performance. XRD analysis shows the crystal mixture consists of 4BS and some various lead borate salts. The greater alkalinity of paste containing a BF combination due to the presence of the sodium ion also improved grid-paste adhesion, as shown by pellet-puncture mechanical tests. Initial tests of experimental plates made with a paste containing 4BS nucleant seeds plus BF showed a 10% improvement in moderately fast discharges (20 minute, the "reserve capacity") versus controls which did not include BF. The inventor extrapolated, based on the well-known Peukert law, that cranking performance should have been improved by at least 10%, but because of the design of the battery test cells, this was not tested in the initial experiments.

Subsequently, the use of BF in battery paste together with a 4BS nucleant was tested at a SLI battery factory. These tests revealed minimal effect on paste mixing (slight initial or final water addition), better/faster curing, and better crystallinity and porosity of the cured plates (as seen in SEM examination). The latter manifested as faster formation performance. A preferred process for using PCA and BF was developed, but the first and three subsequent companies where tests were performed were unwilling or unable to fully comply with the inventor's recommendations. Nonetheless, each of 8 factory tests to date have shown not only improved high-rate battery performance, but also the necessary development of fine-particle high-surface-area 4BS that would explain such improved performance. Data from these tests is summarized in Table 1, below.

In all the tests described in Table 1, a combination of PCA and BF gave improved high-rate battery performance: at companies 1, 2, and 3 this was shown as a >12% increase in CCA despite processing below the recommended values (especially for curing and drying, paste mix peak temperature and oxide quality). Company 4 found higher capacity using PCA and BF in golf car batteries. These have an unpredictable current draw and duty cycle, so that capacity cannot be measured easily, but these approximate a 75 amp discharge and a 90-100 minute discharge time. It was observed that the PCA/BF batteries need recharge only every 2 to 3 days compared with 1 to 2 days for controls.

The ability of the Fluff to convey a material that might otherwise be deleterious into a process so as to be gradually diffused or dispersed may be useful in other applications. For example, the Fluff might be useful to convey colorants into glasses and ceramics. The Fluff might also be useful to convey catalysts for fuel cells or other applications. In another possible battery application, the Fluff might carry barium into plates to act as an "expander" which enhances discharge capacity. In this application, the Fluff could be expected to disperse Ba slowly, during curing, so that any $BaSO_4$ produced would be minimal in size and would not undesirably enhance shedding. This might allow use of barium as an expander within positive as well as negative plates.

The microporous basic lead sulfate Fluff material of the invention is distinctly different from the high surface area lead oxide (HSAO) made by treating an aqueous suspension of lead oxide with ozone, as described by G. Anthony Parker in U.S. Pat. No. 4,388,210. First, the HSAO material is made without sulfate, i.e. merely from oxide., in an aqueous slurry which contains various sodium salts but not specifically sodium tetraborate, which is treated by addition of ozone to create a mixture of lead oxide and lead dioxide. Second, the HSAO material seen under SEM examination has merely a coarse surface texture: it does not have internal microporosity, and consequently cannot store any significant quantity of, for example, a habit-modifying ingredient. Such an ingredient would be coated at best only on the outside of the coarse HSAO, where it would act like bulk, unabsorbed habit-modifier, that is, would dissolve as quickly as habit-modifier without HSAO. Furthermore, the density of the Parker HSAO material is substantially more than 3.5 g/cc.

DETAILED DESCRIPTION OF THE PREFERRED EMBODIMENT

Manufacture of Lead Fluff

The Fluff material of the invention can be made in the same process as the PCA material. Fluff was initially identified as a nuisance and undesirable byproduct of the manufacture of PCA, as described in application Ser. No. 11/234,077, and its production was minimized in order to maximize the production of PCA. Any Fluff still produced was separated during the grinding operation and was scrapped out. The value of Fluff was recognized later.

As disclosed in Ser. No. 11/234,077, PCA can be made by using a range of processing steps carried out on a typical battery paste of, e.g., 5-6 wt % sulfuric acid, 12-16 wt % water, balance leady oxide. Typically this paste is heated to 80-90° C. for about 5-10 minutes. Other examples are given in Ser. No. 11/234,077. Those of skill in the art will recognize this range of temperatures in particular as being considerably higher than the usual ranges used to cure such a paste in the typical battery plate pasting process. If the mixture is mixed of pre-heated ingredients, and especially when the acid is rapidly added, the resultant PCA comprises 3BS and 4BS and also some low density material which is composed of a small residue of lead oxide, some various basic lead sulfate salts including lead sulfate hydroxide and lead sulfate carbonate. By comparison, a typical XRD analysis of Fluff is: 63.7% 4BS, 10.5% 3BS, 7.8% IBS, 13.1% hydrocerrusite, 3.4% litharge form of PbO and 1.1% leadhillite.

If the paste mixing is continued, especially with continued external heating, so that the water is driven off the paste quickly (over on the order of 30 minutes), followed by grinding, the PCA paste breaks down to a powder with grains in the size range from 50 down to <500 mesh. The heating and mixing create drafts such that the finest and lowest-density portion is thrown off, and further fine particles are similarly created during grinding. This low-density material, which is the novel Fluff of the invention, can be collected, e.g., with a vacuum source discharging into a baghouse, in both the mixing and grinding steps, as desired. Fluff might also be collected in a known "dropout" system, or by an air classifier, known in the art for separating fine particles according to their relative sizes. The coarser particles can be returned to the grinder for further reduction, or can be used "as is" as PCA. The larger particles of PCA are primarily 3BS and unreacted lead oxide, with a small residue of free lead. As above, Fluff is a mixture of lead oxide with various basic lead sulfates and a smaller amount of free lead. More significantly, Fluff has a low density (<3.5 g/cc) and correspondingly high porosity, and is insoluble in and does not react with water.

Fluff, unlike PCA, will not by itself nucleate paste to grow 4BS, despite being substantially composed of 4BS. Hence, PCA is still preferably also used in making battery paste, together with BF. Without limiting the invention, it is theorized that the lack of free PbO probably is what prevents Fluff from acting like PCA to nucleate growth of 4BS. However, when Fluff is subsequently incorporated into battery paste, as described below, it is incorporated into the cured paste materials (3BS and/or 4BS) and structure, so that its lead content contributes to the battery function.

The heating, mixing, drying, crushing, and separation of Fluff from battery paste which has been formulated and treated to form PCA and Fluff can be performed over a wide range of conditions, to be optimized depending on starting oxide composition and paste processing characteristics. The yield of Fluff can be improved by modification of these conditions. The yield of Fluff also depends heavily on the processes and apparatus used to collect it.

In one example, starting with two paste mixes totaling 1999 lb of leady oxide, 100 lb of water and 128 lb of 50 wt % (1.400 sp.gr.) aqueous sulfuric acid, the leady oxide and acid were unheated and the water was preheated to 47.6 deg C. The ingredients were mixed, forming a paste which was subsequently dried in the mixer to a residual moisture content of <1%. At this moisture content, the PCA material can be ground readily; at >2% moisture content the grinding operation is less efficient. In the example, the dried powder was ground slowly (500 lb/hr) in a Pulva model B hammermill grinder, and there was no collection of dust during mixing; the yield was 2090 lb of the high-density PCA residue and 15 lb of Fluff. As the PCA passed through the grinder into a collection hopper, Fluff was ejected through the vent port at the top of the grinder into a dropout box which in turn was connected to a ventilation system.

Since the reaction stoichiometry provides a weight gain from oxidation of most of the free Pb in the Fluff, and from the sulfate in the aqueous sulfuric acid, the inventor calculates that a few lb of Fluff was lost but could have been collected if dust collection steps had been performed at the mixer. The goal of this experiment was to maximize the yield of the high-density PCA material for another application, and therefore was to minimize the yield of Fluff; it appears clear that the processing conditions can be optimized for the production of Fluff. More specifically, in previous experiments in making PCA that were carried out on a kilopound scale, hotter water, more rapid acid addition and more rapid grinding were used, and a greater yield of Fluff was achieved. Therefore, for any particular starting combination of oxide material, acid, and water, it is logical to presume that the yield of Fluff can be optimized or maximized responsive to variation in the mixing and/or grinding steps.

Neither the patent nor technical literature known to the applicant describes any method to produce a low density, highly porous form of any basic lead sulfate. Mere mixing of 3BS, 4BS and the other ingredients, even when in a water slurry dried using an open-flame gas heater to make hydrocerrusite and leadhillite in situ, does not yield a low density product, nor a particularly microporous product.

Manufacture of Slow-Dissolving Habit-Modifier/ 4BS Growth Inhibitor

Fluff will cake together when wet, but, upon drying, is readily crushed back to a fine dust. This can be done repeatedly, as shown by its unchanged color, density, and ability to absorb other materials. It appears that neither the 4BS nor 3BS are recrystallized in this process.

In use of Fluff for inhibiting growth of large 4BS crystals in battery manufacture, the study next turned to identification of a suitable material to be absorbed by the Fluff, which would diffuse slowly out of the Fluff carrier to modify crystal habits and growth, as discussed briefly above.

Organics are generally precluded for prevention of large 4BS crystal growth. Although organics are reported to prevent formation of 4BS, experiments with battery paste containing 4BS seeds and organics (such as the lignosulfonates used as negative plate expanders) show that 4BS can be grown. Therefore, the organics prevent nucleation, not growth.

Most inorganic salts (halides, oxyhalides, sulfates, nitrates, nitrites and transition metal oxyanions such as chromate, manganate, etc.) are too expensive, too insoluble, and/or are electrochemically incompatible with the battery reactions.

Carbon-containing anions (acetate, citrate, etc) and the usual organic habit-modifying materials (urea, surfactants, etc) can degrade to acetic acid which will rapidly and undesirably corrode battery grids after oxidation on the $PbO_2$ in the formed positive plates.

It being desired to provide the crystal growth inhibitor as a salt, so as to provide chemical neutrality, a few salts are left as possible candidates for use as inhibitors of growth of large 4BS crystals: hydroxides, borates, oxides, carbonates, bicarbonates, silicates, phosphates, and possibly fluoro-derivatives of these. The alkaline paste will readily dissolve most of these. The counterion (cation) of choice (which is needed so that a salt is added) is probably sodium, based on minimal cost (as compared to, e.g., Li, K, Rb, etc.). Of possible sodium compounds, NaO and NaOH react rapidly, and the carbonate and bicarbonate react more slowly with lead oxide to generate the blood red salt sodium plumbate, and change (reduce) the paste viscosity, so these are inappropriate choices.

This leaves as candidates sodium borates, silicates, and phosphates, and perhaps the peroxysalts mentioned above, although the latter are much more expensive and much less stable than their non-peroxygenated analogues. The literature referred to above shows that borax (this term being used loosely here, as generally in the art, to refer to, e.g., sodium borates of various specific compositions, such as anhydrous borax ($Na_2B_4O_7$), borax pentahydrate ($Na_2B_4O_7.5H_2O$), and borax decahydrate ($Na_2B_4O_7.10H_2O$)) has been used to modify the crystal habits of various soluble transition metal sulfate salts such as $MgSO_4$ and $ZnSO_4$, when used in a concentration of 5 weight percent of the transition metal sulfate. Mixing 5 wt % borax with battery paste changed its characteristics rapidly from a usable paste to a low viscosity suspension. Even as little as 0.1 wt % borax caused the paste to liquefy. Hence, it appears that any direct addition of borax to paste renders the paste useless.

As above, the inventor has found that borax could be absorbed within lead Fluff, and that the resultant BF material would not affect paste characteristics. Moreover, the borax diffused out of the Fluff during curing, such that it eventually modified 4BS growth and reacted to form various lead borate salts which were small in size and high in surface area. The inventor briefly considered other possible microporous carriers for borax, such as $TiO_2$ and $ZrO_2$, but these are generally more expensive than lead Fluff and would remain inert within the plates during the battery life, since these are electrochemically inactive in a lead-acid battery. By comparison, the lead in Fluff contributes to the battery's function. Furthermore, at end of life, these other carriers might cause issues with battery recycling.

Borax is commercially available cheaply in many different forms which vary in terms of amount of hydration from anhydrous borax through 2, 4, 5, and up to 10 waters of hydration. Borax decahydrate (~10 $H_2O$) was chosen, although the pentahydrate works equally well. Manufacturer's literature shows the solubility of borax decahydrate is 170 grams per 100 cc $H_2O$ at 100° C. This was interpolated to an estimated 150 g/100 cc solubility at 80° C. In a first trial, 2 kg of the decahydrate was dissolved in 5 liters of water but this was insufficient since addition of the salt to the hot water cooled the water off, so that some material would not dissolve, or, worse, would crystallize out. 6 liters of water was sufficient to dissolve 2 kg of borax decahydrate. After the borax was dissolved, with the solution maintained at >90° C., Fluff was added. Heating was continued until all the air in the pores of the Fluff had been driven off and the borax solution fully penetrated the pores, and continued until the remaining free water had been boiled off. Although 2 kg of Fluff will absorb 6 liters of the borax solution, there is probably some on the outside of each Fluff grain, as seen by the difficulty in grinding this composition after it has been dried. 3 kg of Fluff fully absorbs the borax solution, forming the desired BF material, and is easy to dry and grind, so the preferred ratio of materials is 6 liters of water, 5 kg of borax decahydrate and 3 kg of Fluff.

The lab-scale production of BF described above was carried out in enameled steel or stainless steel cooking pots heated over electric hot plates, but it is obvious that this can be scaled up for quantity. The water was measured out and heated to >/90° C., and borax decahydrate was weighed out and was added in incremental portions to the pot, such that temperature was maintained above 90° C. so that no borax precipitated out of the solution. After all the borax had been dissolved, the Fluff was weighed out and also added in portions to the pot to maintain the temperature above 90° C., to maintain the complete solubility of the borax. Fluff does not dissolve, so the solution becomes a suspension of the Fluff in the aqueous borax solution. The suspension is heated with the pot partially uncovered such that the volume of the suspension is reduced 10-20%, and the suspension reaches the consistency of a thick mud. In order to control the subsequent drying of the mud, it was found convenient to transfer the mud to smaller, shallower stainless steel pans and then dry these in a laboratory oven at between 80 and 140° C. If the mud is dried too quickly, such that borax separates from the mud rather than being absorbed by the porosity of the Fluff carrier, the batch can be redissolved and drying can be repeated at a lower temperature or at a lower drying rate (for example, by providing less ventilation).

Other materials that might also be useful are compounds which, like borax, that is, sodium borate, include an alkaline anion or hydrogen ion with a suitable cation, such as sodium phosphates, acid phosphates, sulfates, acid sulfates, silicates, fluoborates, or peroxysalts such as perborate, persulfate or percarbonate.

Use of BF Material in Battery Paste

The efficacy of BF as an inhibitor of growth of 4BS crystals requires, first, that it be used with 4BS seed crystal materials, which are available from several commercial sources, and second, that both these seed crystals and the habit-modifier additive BF be mixed intimately into the battery paste. There is some advantage to dry mixing the 4BS seeds with the oxide, since these powders mix together rapidly if not wet, and the 4BS seeds can start growing 4BS crystals during the paste mixing. Less preferred is to mix by adding water first, then oxide and wet mixing this, then adding the 4BS seeds, then adding the acid and then final mixing. The BF material should be added after acid addition is complete, but before final mixing. It may be possible to add BF at an earlier point in the process, for example by absorbing borax onto the Fluff component in an unseparated PCA-Fluff mixture, but conditions for this have not yet been established. As mentioned above, PCA is still used, as described in prior application Ser. No. 11/234,077, as part of the battery paste. After pasting, the use of any 4BS nucleant will allow faster curing, or equal curing at lower temperature, either way requiring less thermal energy. During the cure, the borax dissolves slowly out of the Fluff carrier, reacts with some lead oxide or basic lead sulfate, and modifies the growth of 4BS. Further, the basic lead sulfate carrier (fluff) is incorporated into the crystalline matrix in the cured paste and is available for electrochemical utilization.

More specifically, at curing temperatures >70° C., secondary nucleation of 4BS can occur within the paste. Both primary and secondary nucleated 4BS crystals are limited in growth by the modifying additive. At curing temperatures <70° C., the primary nucleated 4BS crystals (that is, grown from seeds) are smaller in size and/or more numerous than would be grown without the microporous BF carrier and the contained growth modifying additive. Accordingly, the curing temperature can be selected to control the amount of 4BS grown, in accordance with the desired use of the battery; as above, SLI batteries generally are preferred to have more 3BS than 4BS, while the converse is true with deep-cycle batteries.

Laboratory processing tests have shown that less than the calculated 0.5-1 wt % may be effective, in that a residue of borax is found in the sump of the curing chamber after curing a batch of plates containing BF. No similar residue was observed in the plant trials, but may occur during factory production of plates using BF. If so, the amount of BF can be reduced or the residue can be discarded or recycled.

Those of skill in the art will recognize that batteries are typically "formed", that is, initially charged, using either a "1-shot" or a "2-shot" formation technique. In 1-shot formation, the unformed battery is filled with a more concentrated aqueous sulfuric acid electrolyte; as the battery undergoes initial (formation) charge, the sulfates from the various basic lead sulfates in the plate increase the electrolyte concentration modestly. For example, a filling acid added at a specific gravity of 1.220 to 1.250 is increased to the range 1.270 to 1.300, and the battery is shipped and sold at this concentration. 2-shot formation involves initial use of an electrolyte of very low concentration, 1.005 to perhaps 1.030, which after formation increases to the range 1.050 to 1.180. This acid is dumped out and the battery is refilled with a more concentrated electrolyte solution slightly higher in density than the desired final/shipping specific gravity. For example, a final specific gravity of 1.285 might be achieved by adding acid of specific gravity 1.290 to a residue inside the battery of 1.100. Most SLI batteries are formed using the 1-shot process, while most deep discharge batteries (truck/bus, golf cart, forklift, stationary) are formed by the 2-shot process.

Any further residual borax (or similar crystal-growth-modifying additive) within the plates will be retained within the cell if the battery had been formed by the 1-shot process, but neither borax, sodium nor any of the other anions will be deleterious to battery performance and life. Such further residue within the plates might be washed out during the acid-dumping step if the battery had been formed by the 2-shot process. The residue can be separated from the dumped acid, allowing its reuse.

There may be some application for using the growth-modifying additive, for example sodium borate in any of its commercial forms, to deliberately decrease the viscosity of a battery paste which is otherwise difficult to paste, and for which the paste formulation cannot be changed by adding more liquid.

Table 1 below summarizes the results of tests performed at four different battery manufacturer's facilities. The notes and column headings explain the test circumstances and conditions. For example, test 1-1 was carried out on Jun. 9, 2010; the grinding was done using a ball mill (BM); the paste mix included 550 kg of oxide, 12.5 kg of PCA, 7 kg of BF, 61 kg of water, and 53.5 kg of sulfuric acid; and an Oxmaster-type mixer was used. The curing conditions were that the plates were stacked, the curing temperature was <50° C., the relative humidity was >95%, and the cure time was 23.55 hours for plates containing PCA and the BF additive. In several cases, control plates were also made, using compositions without BF, and the data as to these is reported as well.

As indicated, where CCA values were applicable, improvements of typically 12-15% were noted where the BF was added to the paste mix.

TABLE 1

SUMMARY OF PLANT TESTS

| Company-test no. | Date | Paste mix composition: Kg | Mixer type |
|---|---|---|---|
| Recommendation | — | Oxide/PCA/BF/H$_2$O/acid 1.400 sp. gr. BP1000/22.7/12-18/104/128.8 | Oxmaster |
| 1-1 | June 2009 | BM 550/12.5/7/61/53.5 | Oxmaster |
| 1-2 | July 2009 | BM 500/12.5/7/61/53.5 | Oxmaster |
| 2-1 | July 2010 | BP1000/15/7/126/119 | Oxmaster |
| 3-1 | April 2010 | BM 550/11.5/8/65/50 | Eirich |
| 3-2 | July 2010 | BM 550/11.5/8/62.5/60.4 | Eirich |

| | Curing variables (C)ure: temp/RH/Time | End of Cure/Dry | | |
|---|---|---|---|---|
| Co.-test no | (D)ry: paste H$_2$O 5%-8% for >/=4 hrs | % Pb | % H$_2$O | Notes |
| Recommendation: | racked, C > 80° C., >95% RH, , </=48 hrs | <2 | <1 | |
| 1-1 | stacked, C < 50° C., >95% RH, 23.55 hrs BF, 39 hrs control D not specified | <2 | <1 | |
| 1-2 | same as 1-1 | same as 1-1 | | |
| 2-1 | stacked, C 70° C., 100% RH, 14 hrs D 75° C., 0% RH 20 hrs | 2.5 not measured | 3.0 | note 5 |
| 3-1 | stacked C < 70° C. | | | |
| 3-2 | stacked C/D profile NOTE 6 | stacked >2 Racked <2 | >2 >2 | |

TABLE 1-continued

SUMMARY OF PLANT TESTS

| | | | | |
|---|---|---|---|---|
| 4-1 | stacked C > 80° C., >95% RH, 48 hrs<br>D > 80° C. unknown decreasing RH | | <2 | <1 |

| Co.-test no | CCA improvement | Other processing/performance | SEM/porosity/XRD |
|---|---|---|---|
| Recommendation: | predicted >10% | Predict: notes 1, 2, 3, 4 | >80% 4BS with >80%<br>Crystals <20 microns |
| 1-1 | 12% | notes 1, 2, 3, 4 | mostly 4BS, some large xtal |
| 1-2 | 15% | notes 1, 2, 3, 4 | BF: very good 3BS, 4BS,<br>Excellent porosity<br>Control: poor 3BS, unreacted oxide<br>Poor porosity |
| 2-1 | 15% | not yet reported | BF: excellent 4BS <15 microns<br>Excellent porosity<br>C: mostly 3BS, unreacted oxide<br>Poor porosity |
| 3-1 | >12% | not yet reported | BF: <10% large 4BS >20 microns<br>Predominantly smaller 4BS<br>Excellent porosity<br>C: mostly unreacted oxide,<br>poor porosity |
| 3-2 | not yet reported | not yet reported | BF: not yet examined<br>C: see test 3-1 |
| 4-1 | not applicable | Notes 1, 2, 3, 4 | BF: small 4BS <20 microns<br>Excellent porosity<br>C: (PCA but no BF) 4BS 10 to 40<br>microns, excellent porosity |

NOTES:
Paste mix composition: oxide preparation BM = ball mill, BP = Barton pot
1 faster formation: tests 1-1 and 1-2 28 hrs BF vs. 30 hrs control
2 less gassing on formation
3 less water loss on formation
4 mechanically stronger plate: tests 1-1 and 1-2 mechanical drop test, test 4, puncture
5 unknown procedures for % Pb, % H$_2$O, poor equipment and technique, unknown calibration
6 Profile: 80° C./95% RH/8 hrs but actual 70° C./93% RH/8 hrs, then 80° C./70% RH/2 hrs, then 80° C./50% RH/4 hrs, then 80° C./20% RH/2 hrs, then 80° C./0% RH/4 hrs, then 50° C./0% RH/2 hrs, then 40° C./0% RH/2 hrs.

While several examples of the invention have been provided above, the invention is not to be limited thereto.

What I claim is:

1. A method of manufacture of a composition of matter comprising basic lead sulfates which has high internal porosity and density <3.5 g/cc, said method comprising the steps of mixing leady lead oxide, water and sulfuric acid into a doughy mass, said mixing step being performed very rapidly, in less than 5 minutes, and at elevated temperature, greater than 70° C., followed by grinding, such that the doughy mass is reduced to a fine microporous powder of lead salts, and wherein the ratio of oxide Lo water to sulfuric acid is 100 parts by weight of oxide, to from 10 to 30 parts water, to from 10 to 30 parts of 50 wt % sulfuric acid (1.400 sp.gr), and comprising the further step of mixing the fine powder with a modifying additive that, when used in a battery paste, will modify the growth of tetrabasic lead sulfate and promote the growth of other small lead sulfate crystals, where the low-density microporous lead salt particles act as a carrier for the modifying additive.

2. The method of claim 1, where the water is heated to >90° C.) and mixed with the oxide, this mixture then being mixed with the acid, which is added as a fine spray in <2 minutes.

3. The method of claim 1, wherein the powder is ground until it achieves a degree of fineness such that >99% of the particles thus produced will pass through a 325 mesh sieve.

4. The method of claim 3, comprising the further step of collecting the smaller or lighter particles (<325 mesh) in a wet scrubber.

5. The method of claim 3, comprising the further step of collecting the smaller or lighter particles (<325 mesh) in a baghouse.

6. The method of claim 3, comprising the further step of collecting the smaller or lighter particles (<325 mesh) in a dropout system.

7. The method of claim 3, comprising the further step of separating the heavier, coarser grinder throughput from the finer particles by an air classifier, and collecting any additional finer particles.

8. The method of claim 1, wherein the modifying additive is provided in an aqueous solution, and comprising the further step of suspending the fine microporous lead salt particles in the aqueous solution, boiling the solution to expel air from the pores of the microporous lead salt particles, and wherein heating is continued until the water is driven off and the modifying additive is dispersed substantially within the microporous lead salt particles.

9. The method of claim 1, wherein the modifying additive is selected from the group comprising borax and other combinations of an alkaline cation with a suitable anion such as borates, phosphates, acid phosphates, silicates or fluoroborates.

10. A method of making a battery paste, comprising the steps of mixing a conventional battery paste comprising leady oxides, water and sulfuric acid with a nucleant material for tetrabasic lead sulfate and with the fine porous powder and modifying additive made according to the method of claim 1.

11. The method of claim 10, wherein the nucleant material is mixed intimately with the oxide at the start of paste mixing and the fine porous powder and modifying additive are added near the end of paste mixing, after acid addition is complete.

12. The method of claim 10, wherein the nucleant is added after mixing leady oxide with water, before acid addition and mixture, and the fine porous powder which contains the modifying additive is added at the end of acid addition and before final mixing.

13. A method of making a battery plate, comprising the steps of making the battery paste of claim 10, applying the paste to battery plate grids and curing the paste at >70° C., such that tetrabasic lead sulfate crystals are grown that are more numerous and/or smaller than would be grown without the fine porous powder and modifying additive.

14. A method of making a battery plate, comprising the steps of making the battery paste of claim 10, applying the paste to battery plate grids and curing the plates at <70° C. such that no or limited secondary nucleation of tetrabasic lead sulfate occurs.

15. A lead-acid battery, which contains positive and/or negative plates made according to the method of claim 13.

16. A lead-acid battery, which contains positive and/or negative plates made according to the method of claim 14.

17. The method of claim 1, wherein the ratio of oxide to water to sulfuric acid is 100 parts by weight of oxide to 10 parts by weight of water to 15 parts by weight of acid.

* * * * *